(12) United States Patent
Erhard

(10) Patent No.: US 10,686,541 B2
(45) Date of Patent: Jun. 16, 2020

(54) PROCESSING DEVICE AND METHOD

(71) Applicant: Rohde & Schwarz GmbH & Co. KG, München (DE)

(72) Inventor: Mathias Erhard, München (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 16/091,170

(22) PCT Filed: Feb. 14, 2017

(86) PCT No.: PCT/EP2017/053286
§ 371 (c)(1),
(2) Date: Oct. 4, 2018

(87) PCT Pub. No.: WO2017/174237
PCT Pub. Date: Oct. 12, 2017

(65) Prior Publication Data
US 2019/0158196 A1 May 23, 2019

(30) Foreign Application Priority Data

Apr. 5, 2016 (DE) .................. 10 2016 205 609

(51) Int. Cl.
*H04B 17/318* (2015.01)
*H04B 1/10* (2006.01)
(Continued)

(52) U.S. Cl.
CPC ......... *H04B 17/318* (2015.01); *H04B 1/1027* (2013.01); *H04B 7/0817* (2013.01); *H04B 7/022* (2013.01)

(58) Field of Classification Search
CPC .. H04B 17/318; H04B 1/1027; H04B 7/0817; H04B 7/022
See application file for complete search history.

(56) References Cited

U.S. PATENT DOCUMENTS 9,641,365 B2    5/2017  Detert
9,912,998 B2 *  3/2018  Franke ................... H04H 40/90
(Continued)

FOREIGN PATENT DOCUMENTS

DE    10 2013 212 067 A1    1/2015

OTHER PUBLICATIONS

International Search Report and Written Opinion for International Application No. PCT/EP2017/053286, dated May 8, 2017, 11 pages.
(Continued)

*Primary Examiner* — Chandrahas B Patel
(74) *Attorney, Agent, or Firm* — Westman, Champlin & Koehler, P.A.

(57) ABSTRACT

The present invention discloses a processing device for processing a radio signal, comprising a plurality of receivers designed to receive the radio signal in a predetermined frequency range and to output each signal as a received signal, comprising a detection apparatus designed to detect, for each received signal, a number of sources in the corresponding radio signal, comprising a selection apparatus designed, if there is more than one source in at least one of the received signals, to select one of the receivers on the basis of the information on the number of sources in the individual received signals and to forward the received signal of said selected receiver. The present invention also discloses a corresponding method.

16 Claims, 4 Drawing Sheets

(51) Int. Cl.
 *H04B 7/08* (2006.01)
 *H04B 7/022* (2017.01)

(56) References Cited

U.S. PATENT DOCUMENTS 10,027,517 B2   7/2018   Detert
10,244,487 B2 * 3/2019   Yokoyama ............. H04H 20/38

OTHER PUBLICATIONS

Rohde & Sohwarz Gmbh & Co. Kg: "R&S Series4200 Software Defined Radios VHF/UHF radio family for ATC communications", Jul. 1, 2013 (Jul. 1, 2013), XP055366613, Retrieved from the Internet: URL:https://cdn.rohde-sohwarz.com/pws/dl_downloads/dl_common_library/dl_brochures_and_datasheets/pdf_1/Series4200_bro_en_5213-5700-12_v0700.pdf [retrieved on Apr. 24, 2017], p. 2-p. 3, p. 10-p. 11, p. 15-p. 20; [most recently downloaded Oct. 4, 2018].

* cited by examiner

PROCESSING DEVICE AND METHOD

CROSS-REFERENCE TO RELATED APPLICATIONS

This Application is a Section 371 National Stage Application of International Application No. PCT/EP2017/053286, filed 14 Feb. 2017, and published as WO 2017/174237 A1 on 12 Oct. 2017, in English, the contents of which are hereby incorporated by reference in their entirety.

FIELD OF THE INVENTION

The present invention relates to a processing device for processing a radio signal and to a corresponding method.

TECHNICAL BACKGROUND

The present invention will be described below mainly in relation to aircraft radio. It goes without saying, however, that the present invention can also be used in any other field in which radio signals can be processed.

Aircraft radio is an important medium for air traffic controllers to be able to give individual aircraft detailed instructions. To do so, air traffic controllers are provided with controller workstations, which comprise a headset, a voice communication system and a radio device having a plurality of receivers.

In aircraft radio, amplitude-modulated signals having two sidebands are typically used. These signals are normally picked up by the receivers and forwarded to the relevant controller workstation.

In the process, the voice communication system of the controller workstation usually selects the signal of the receiver that receives the greatest signal level. This mechanism is also known as Best Signal Selection.

DISCLOSURE OF THE INVENTION

There is the need to improve the selection of the signal provided to the air traffic controller.

The present invention discloses a processing device having the features of claim 1 and a method having the features of claim 10.

Accordingly, the following is provided:

A processing device for processing a radio signal, comprising a plurality, i.e. two or more, receivers designed to receive the radio signal in a predetermined frequency range and to output each signal as a received signal. The receivers can for example be AM receivers, as used in aircraft radio. These receivers can for example receive AM-modulated radio signals having two sidebands. The processing device further comprises a detection apparatus designed to detect, for each received signal, a number of sources in the corresponding radio signal, i.e. to ascertain whether a radio signal comprises superposed signals from different sources, for example. Lastly, a selection apparatus is provided in the processing device and is designed, if there is more than one source in at least one of the received signals, to select one of the receivers on the basis of the information on the number of sources in the individual received signals and to forward the received signal of said selected receiver, for example to an output system that displays the selected received signal to the air traffic controller.

The following is also provided:

A method for processing a radio signal, comprising the steps of receiving the radio signal by means of a plurality of receivers in a predetermined frequency range, outputting a received signal for each of the receivers, detecting a number of sources in the corresponding radio signal for each received signal, selecting, if there is more than one source in at least one of the received signals, one of the receivers on the basis of the information on the number of sources in the individual received signals, and forwarding the received signal of the selected receiver.

DESCRIPTION OF THE INVENTION

The individual receivers can for example be allocated to a common sector in space and be arranged at various locations within this sector. The individual receivers thus do not necessarily receive the same radio signals. For example, the radio signals may have different transit times between the individual receivers. The signal strength at which the radio signals are received generally depends on the distance between the signal source and the particular receiver. Lastly, reflections and other superpositions can affect the radio signals.

A radio signal emitted by a source can thus be picked up differently at different receivers.

Signals from two sources, for example radio messages from two aircraft, may also be superposed on one another. At least some of the radio messages are thus transmitted at the same time. This can also be termed double transmission.

It is important that this is detected in the system and that the relevant air traffic controller is notified.

Normally, the received signal of the receiver that has the largest receipt level is selected to be played. In particular in the event of a double transmission, however, the signal having the weaker level can thus be slightly covered by the signal having the stronger level. This occurs at a difference in levels of as little as approximately 10 dB, for example.

By means of the detection apparatus according to the invention, a double transmission of this type can be detected. To do so, the detection apparatus can transform each received signal for example into the frequency domain and mirror a sideband of the AM signal (also referred to as a conjugate complex signal). The mirrored sideband can then be subtracted from the other sideband. In the remaining signal, for example the carrier or a signal component of a second, covered signal can then be identified.

The present invention is based on not actually automatically selecting the received signal of the receiver that has detected the greatest signal level.

Instead, in the present invention, a selection criterion that reduces the likelihood of a strong signal being superposed on a weak signal is selected, such that an air traffic controller can no longer pick up the weak signal, for example.

Advantageous embodiments and developments can be found in the dependent claims and in the description with reference to the drawings.

In an advantageous embodiment, the detection apparatus can be designed, if there is more than one source in a received signal, to determine a level of each signal component corresponding to the individual sources. If there are a plurality of receivers, each receiver can receive a different radio signal, even if the sources of the radio signals are the same. For example, a first source may be closer to a first receiver and a second source closer to a second receiver. At each receiver, therefore, one signal may be superposed on the other. If the levels of the individual signals in the received signals are determined, this information can be provided to the selection apparatus and used for example for selecting a received signal.

In another embodiment, the selection apparatus can be designed, if there is more than one source in a received signal, to select the receiver in whose received signal the difference in the levels for the individual sources is the smallest. The smaller the level differences, the simpler it is for an air traffic controller to recognise a double transmission, for example. Thus, if the received signal having the smallest level differences is selected, the likelihood of an air traffic controller failing to hear a double transmission is reduced to a minimum.

In one embodiment, the selection apparatus can be designed, if there is more than one source in a received signal, to select the receiver in whose received signal the difference in the levels for the individual sources is the greatest. The signal having the stronger level is thus only distorted to a minimum by the signal having the weaker level. This allows an air traffic controller to understand one of the signals to the best possible extent, for example.

In one embodiment, the processing device can comprise a signal generation apparatus that is designed, if there is more than one source in a received signal, to generate an alert signal that is output by the selection device together with the selected received signal. For example, the signal generation apparatus can generate an audible alert signal that can be played before or after the received signal. In this way, for example, an air traffic controller can identify that this is a double transmission, even if he only hears one signal. This is advantageous in particular when the selection apparatus selects the receiver in whose received signal the difference in the levels for the individual sources is the greatest.

In one embodiment, the selection apparatus can be designed, if there is more than one source in at least two of the received signals, to determine whether the level of a different source is the strongest level in different received signals. If two receivers are for example at opposite ends of geographical sectors, it may be that a first signal of a first aircraft is the strongest received at a first receiver. At the opposite transmitter, however, a second signal from a second aircraft can for example be the strongest received. Normally, only the signal having the strongest level (of an individual signal) is played to the air traffic controller. In some circumstances, therefore, the air traffic controller may not pick up the second signal. However, if it is now determined which of the signals in which received signal is the strongest received, this information can be used in the further analysis of the received signals.

In one embodiment, the selection apparatus can be designed to output, one after the other, the received signals in which the level of a different source is the strongest level. If different sources are represented by the strongest signal components in different received signals, the signals of the individual sources, i.e. radio messages from a pilot for example, can each be detected from the different received signals. If an air traffic controller is now played both signals one after the other, he can detect the two signals in succession.

In one embodiment, the selection apparatus can be designed to subtract from one another the received signals in which the level of a different source is the strongest level, for example in the time or frequency domain, and to output the resultant signal. For example, a first signal in a first received signal may only be received slightly more strongly than a second signal. The signals thus distort each other and may no longer be able to be understood. In a second received signal, however, the first signal may be barely present or not present at all. If the second received signal is now subtracted from the first received signal, the resultant signal mainly comprises components of the first signal, which is therefore very easily understood. After the resultant signal has been played, the second received signal can be output, or vice versa.

In one embodiment, the processing device can comprise a transmission apparatus that is designed, if more than one source is detected in a radio signal, to output an alert signal to the corresponding sources. For example, the alert signal can be sent to two aircraft whose radio signals have been superposed in time. In particular, the alert signal can also be output to each of the sources with a delay, such that repeated transmission of the signal in question does not lead to superposition again.

The above embodiments and developments may be combined with one another in any desired manner within reason. Further possible embodiments, developments and implementations of the invention also include combinations not explicitly mentioned of features of the invention described above or in the following in relation to the embodiments. In particular, a person skilled in the art will also add individual aspects to each basic form of the present invention as improvements or additions.

BRIEF DESCRIPTION OF THE DRAWINGS

The present invention is described in greater detail below on the basis of the embodiments set out in the schematic drawings, in which.

In all the drawings, like elements and devices or those with the same function have been provided with the same reference signs, unless indicated otherwise.

DESCRIPTION OF EMBODIMENTS OF THE INVENTION

Figure 1:
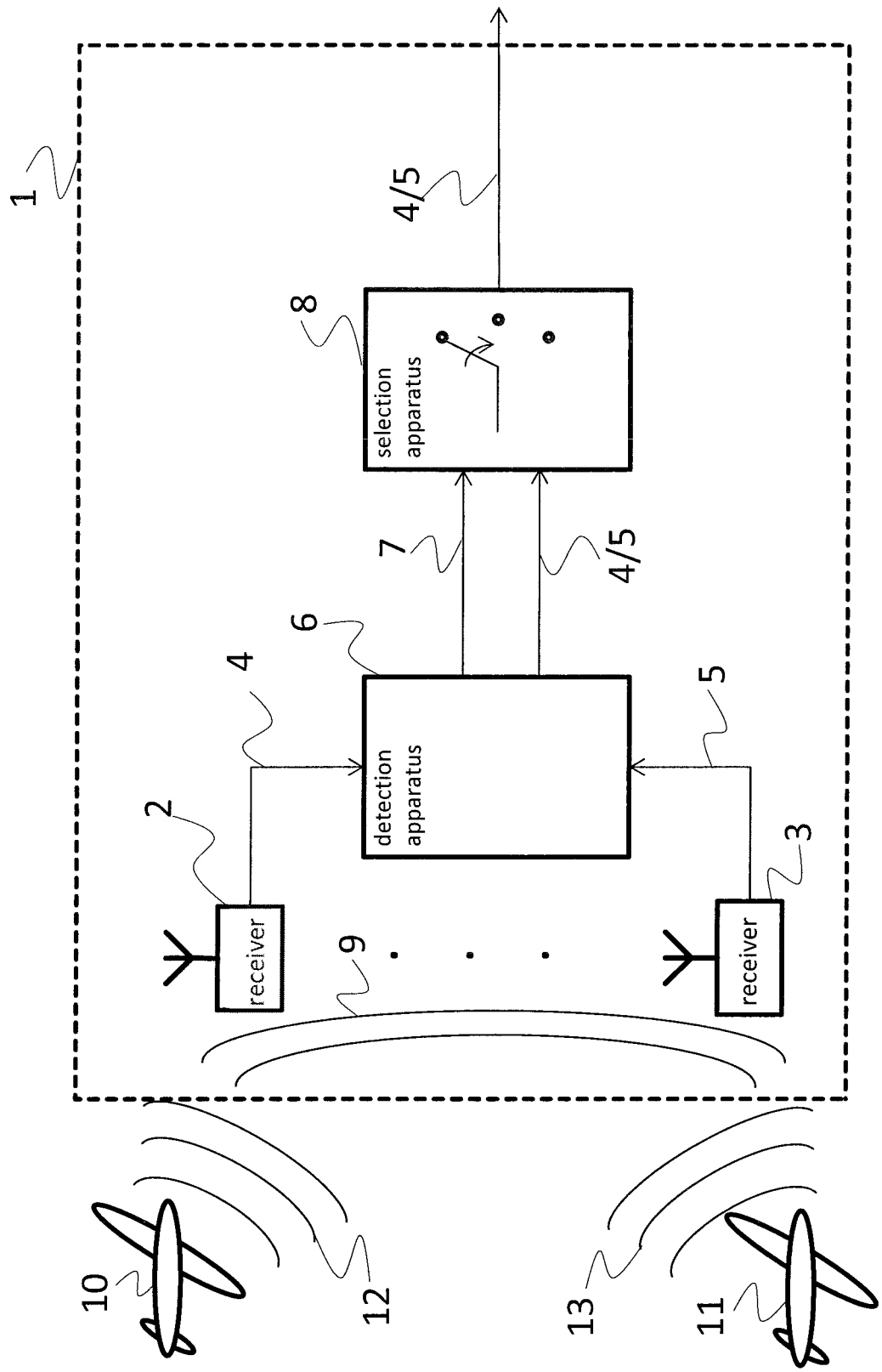
FIG. 1 is a block diagram of an embodiment of a processing device according to the invention.

FIG. 1 is a block diagram of an embodiment of a processing device 1 according to the invention. The processing device 1 can for example be integrated in an air traffic control system at an airfield.

The processing device 1 comprises a plurality of receivers, of which only the receivers 2 and 3 are shown. Other possible receivers are indicated by three dots. The individual receivers 2, 3 receive a radio signal 9 (formed here merely by way of example from the signal components 12, 13). In this case, the signal components 12, 13 are transmitted from respective aircraft 10, 11 and are superposed at the receivers 2, 3 to form the radio signal 9. It goes without saying that superposition of this type only occurs when two signal sources 10, 11 actually transmit a signal 12, 13 at the same time.

Since the distances between the aircraft 10, 11 and the individual receivers 2, 3 are not the same, the signal strengths of the individual signal components 12, 13 picked up by the receivers 2, 3 are different. In this case, the signal strengths are not only affected by the distance of the aircraft 10, 11 to the particular receiver 2, 3. Other factors may include for example reflections or damping owing to different objects between the aircraft 10, 11 and the receivers 2, 3.

The receivers 2, 3 thus each output different received signals 4, 5, in which the individual signal components 12, 13 are present at different strengths.

The individual received signals 4, 5 are now picked up and analysed by the detection apparatus 6. To do so, the detection apparatus 6 analyses the individual received signals 4, 5 and checks them for the presence of two signal components 12, 13. For this purpose, the detection apparatus 6 can transform the received signals 4, 5 for example into the frequency domain, where it can identify the carrier 20 (see FIG. 4) of the stronger signal component 12, 13. Next, one of the sidebands 21, 22 corresponding to this carrier 20 can be mirrored and subtracted from the other sideband 22, 21. A conclusion can then be drawn from the remaining signal on whether there is another carrier 23 or signal component 24, 25.

The detection apparatus 6 provides the information on the number 7 of possible sources, i.e. aircraft 10, 11, or signal components 12, 13 to the selection apparatus 8 together with the received signals 4, 5.

On the basis of the information on the number 7 of signal components 12, 13, the selection apparatus 8 can now select which received signal(s) 4, 5 are output. These output received signals 4, 5 are then played to an air traffic controller, for example.

To select the received signals 4, 5 to be output, the selection apparatus 8 can determine, within the received signals 4, 5, the level of the signal components 12, 13 corresponding to the individual sources 10, 11. On the basis of these levels, the selection apparatus 8 can, for example, select the received signal 4, 5 in which the difference in levels for the individual sources, i.e. aircraft 10, 11 in this case, is the smallest. This increases the likelihood that an air traffic controller can hear the double transmission solely because of the distortions between the signal components 12, 13.

Alternatively, the selection apparatus 8 can select the received signal 4, 5 in which the difference in levels for the individual sources, i.e. aircraft 10, 11 in this case, is the greatest. This allows the air traffic controller to understand at least one of the signal components 12, 13 as well as possible.

The selection apparatus 8 can also ascertain whether the level of a different source 10, 11 is the strongest level in different received signals 4, 5. This can be done, for example, by searching for the maximum level in the frequency domain and comparing the frequencies of each maximum found in the received signals 4, 5. If each of these maximums has a different frequency, a different signal component 12, 13 is dominant in the individual received signals 4, 5.

If the selection apparatus 8 recognises a different attribute of this kind in the individual signal components 12, 13 in the received signals 4, 5, it can output, one after the other, the received signals 4, 5 in which the level of a different aircraft 10, 11 is the strongest level.

The selection apparatus 8 can also subtract from one another the received signals 4, 5 in which the level of a different source 10, 11 is the strongest level, and output the resultant signal. This can minimise the mutual distortions of the signal components 12, 13.

For example, a first signal component may be dominant in a first received signal and a second signal component may be dominant in a second received signal. However, the less dominant signal components can still cause distortion.

The selection apparatus 8 can now comprise appropriate signal processing that can scale the dominant signal to the level at which this signal is contained in the other received signal and deduct it therefrom. As described above, the levels can for example be determined in the frequency domain. The resultant signals then comprise just one of the signal components 12, 13, and are thus very easily understood.

Figure 2:
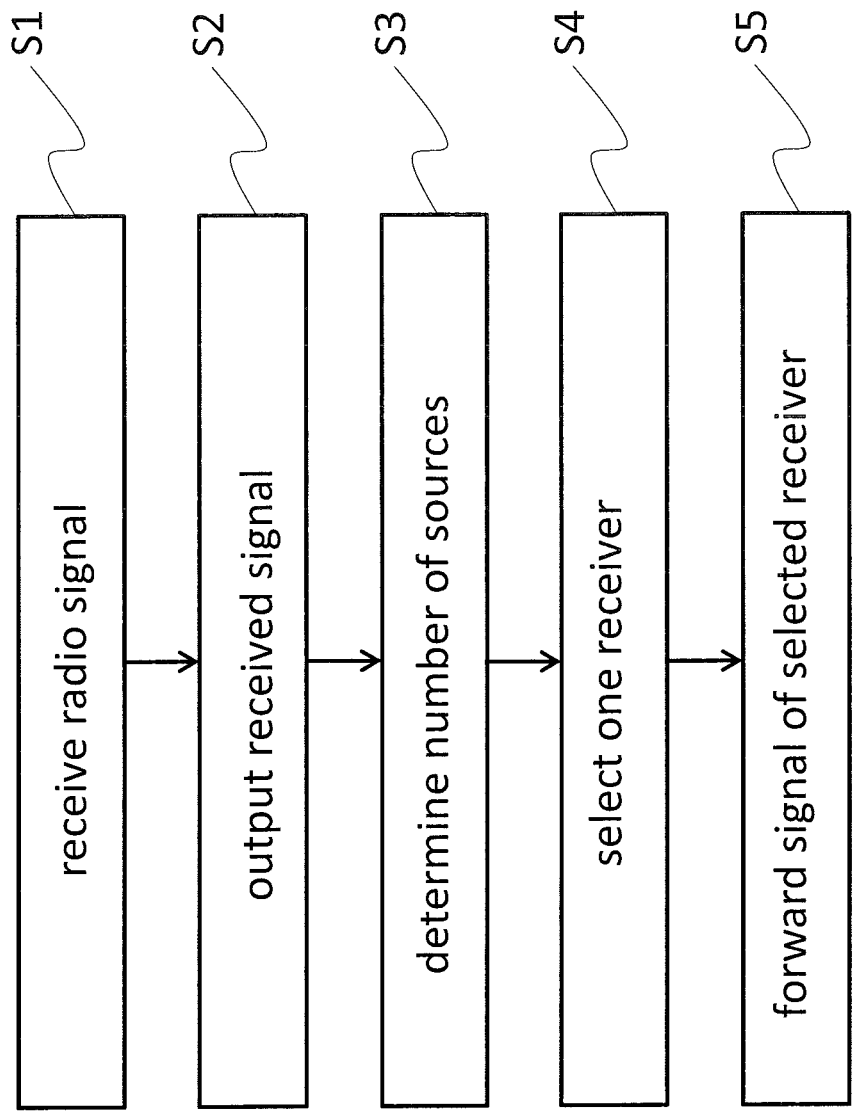
FIG. 2 is a flow chart of an embodiment of a method according to the invention.

FIG. 2 is a flow chart of an embodiment of a method according to the invention for processing a radio signal 9.

In a first step S1, the radio signal 9 is received in a predetermined frequency range by a plurality of receivers 2, 3. The radio signal 9 may for example be an amplitude-modulated signal having a carrier 20, 23, a lower sideband 21, 24 and an upper sideband 22, 25 (see FIG. 4). For each of the receivers 2, 3, a received signal 4, 5 is then output—S2.

In step S3, a number 7 of sources 10, 11 is determined for each of the received signals 4, 5. If there is more than one source 10, 11 in at least one of the received signals 4, 5, one of the receivers 2, 3 is selected in step S4 and the received signal 4, 5 of the selected receiver 2, 3 is forwarded—S5.

When detecting the number 7 of sources 10, 11, a level for each signal component 12, 13 corresponding to the individual sources 10, 11 can be determined. In this case, the level of a carrier signal 20, 23 of each signal component 12, 13 can be determined, for example.

This information can then be used in the selection S4. For example, the received signal 4, 5 of the receiver 2, 3 in whose received signal 4, 5 the difference in the levels for the individual sources 10, 11 is the smallest can be selected. Alternatively, for example, in the selection S4 the received signal 4, 5 of the receiver 2, 3 in whose received signal 4, 5 the difference in the levels for the individual sources 10, 11 is the greatest can be selected.

Comparing the individual received signals 4, 5 with one another can also provide information for selecting the individual received signals 4, 5. For example, it can be determined whether the level of a different source 10, 11 is the strongest level in different received signals 4, 5. If this is the case, it means that another signal can be heard more clearly in the particular received signal 4, 5.

In these cases, the received signals 4, 5 in which the level of a different source 10, 11 is the strongest level can be output one after the other. In addition, the received signals 4, 5 in which the level of a different source 10, 11 is the strongest level can also be subtracted from one another and the resultant signal output.

Furthermore, if there is more than one source 10, 11 in a received signal 4, 5, the method can provide for the generation of an alert signal 15 that is output together with the selected received signal 4, 5. The alert signal 15 can also be output to the sources 10, 11, i.e. to the aircraft 10, 11 or their pilots, for example.

Figure 3:
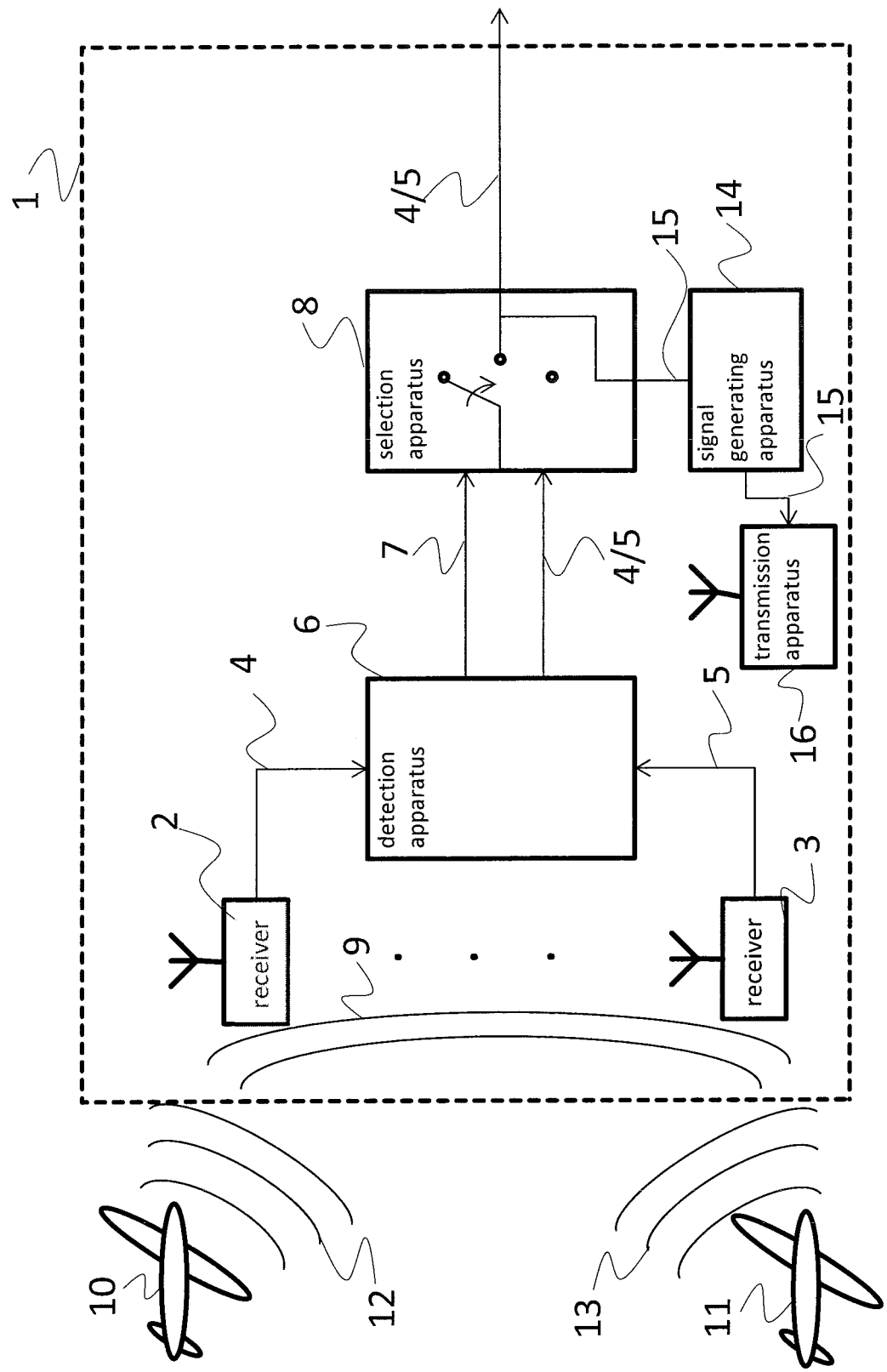
FIG. 3 is a block diagram of another embodiment of a processing device according to the invention.

FIG. 3 is a block diagram of another embodiment of the processing device 1. By comparison with the processing device 1 in FIG. 1, a signal generation apparatus 14 and a transmission apparatus 16 have been added to the processing device 1 in FIG. 3.

If a double transmission is identified, the signal processing apparatus 14 can generate an alert signal 15 that can be played to an air traffic controller before or after the actual received signal 4, 5, for example. At the same time, the transmission apparatus 16 can also transmit the alert signal 15 to the aircraft 10, 11 such that the pilots thereof are also informed of the double transmission.

In particular if the selection apparatus 8 only selects the received signal 4, 5 in which the difference in levels for the individual aircraft 10, 11 is the greatest, the alert signal 15 can notify the air traffic controllers and pilots that there is a double transmission.

Figure 4:
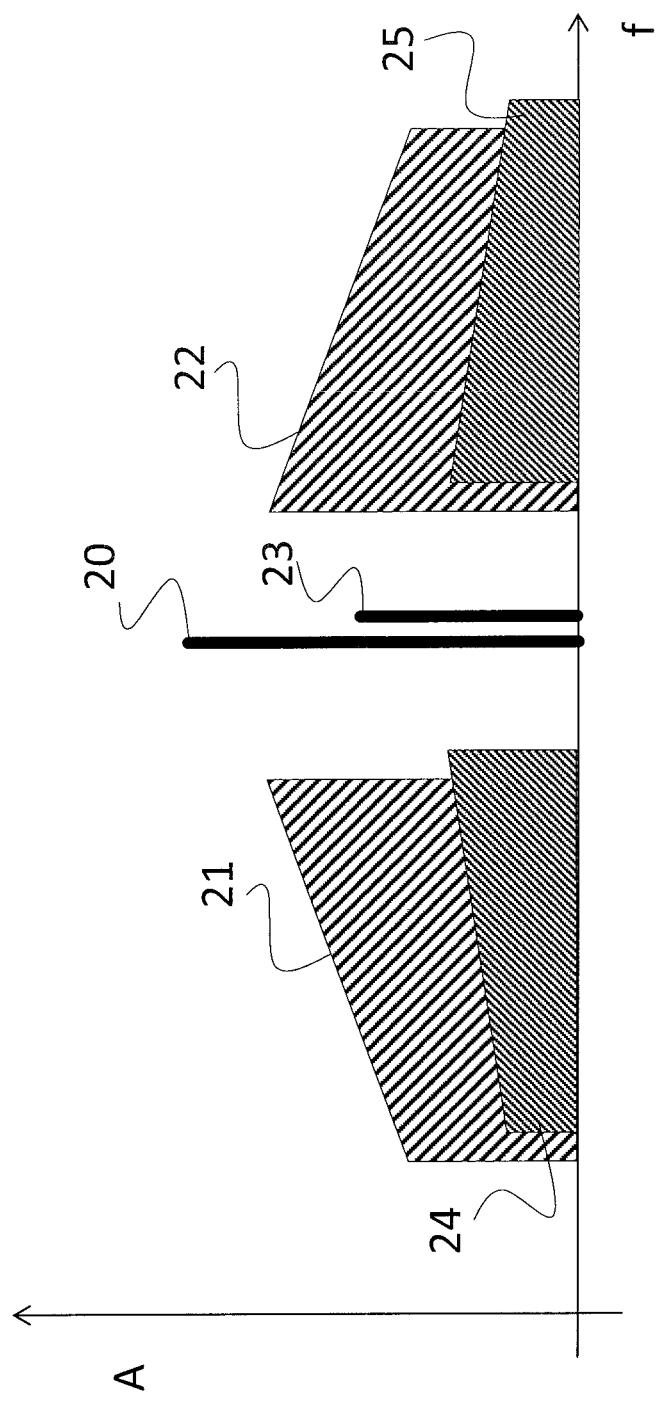
FIG. 4 is a graph showing two superposed signals in the frequency domain.

FIG. 4 is a graph showing two superposed signals in the frequency domain.

The first signal comprises a carrier 20 having a first level that is higher than the level of the carrier 23 of the second signal. Each signal also has a lower sideband 21, 24 and an upper sideband 22, 25.

It can also be seen that the frequencies of the carriers 20, 23 are shifted relative to one another. The lower and upper sidebands 21, 24 and 22, 25 are thus also shifted relative to one another.

When there is a difference in the levels of the carriers 20, 23 of as little as 10 dB, the signal having the lower level can be completely covered by the other signal. It can therefore not be picked up by air traffic controller.

As described above, a transformation into the frequency domain can be carried out to detect the second signal. In the frequency domain, a sideband of the stronger carrier 20, e.g. sideband 21, can then be mirrored and subtracted from the other sideband 22. It can be seen that the remaining signal does not contain a second signal.

Although the present invention has been described above on the basis of preferred embodiments, it is not limited thereto and instead can be modified in many ways. In particular, the invention can be altered or modified in many ways without departing from the basic concept of the invention.

The individual elements of the processing device can comprise discrete components and/or some can be implemented as a program executed on a computer, for example.

LIST OF REFERENCE SIGNS

1 Processing device
2, 3 Receiver
4, 5 Received signal
6 Detection apparatus
7 Number
8 Selection apparatus
9 Radio signal
10, 11 Source
12, 13 Signal component
14 Signal generation apparatus
15 Alert signal
16 Transmission apparatus
20, 23 Carrier
21, 24 Lower sideband
22, 25 Upper sideband
S1-S5 Method steps

The invention claimed is:

1. A processing device for processing a radio signal, the processing device comprising:
a plurality of receivers designed to receive the radio signal in a predetermined frequency range and to output each signal as a received signal;
a detection apparatus designed to detect, for each received signal, a number of sources in the corresponding radio signal;
a selection apparatus designed, if there is more than one source in at least one of the received signals, to select one of the receivers on the basis of the information on the number of sources in the individual received signals, and to forward the received signal of said selected receiver,
wherein, if there is more than one source in a received signal, at least one of the detection apparatus and the selection apparatus is designed to determine a level of each signal component corresponding to the individual sources, and the selection apparatus is designed to select the receiver according to the determined levels.

2. The processing device of claim 1, further comprising a transmission apparatus designed, if more than one source is detected in a radio signal, to transmit an alert signal to the corresponding sources.

3. The processing device of claim 1,
wherein, if there is more than one source in a received signal, the selection apparatus is designed to select the receiver in whose received signal the difference in the levels for the individual sources is the smallest.

4. The processing device of claim 1,
wherein, if there is more than one source in a received signal, the selection apparatus is designed to select the receiver in whose received signal the difference in the levels for the individual sources is the greatest.

5. The processing device of claim 1,
further comprising a signal generation apparatus designed, if there is more than one source in a received signal, to generate an alert signal that is output by the selection apparatus together with the selected received signal.

6. The processing device of claim 1,
wherein the selection apparatus is designed, if there is more than one source in at least two of the received signals, to determine whether the level of a different source is the strongest level in different received signals.

7. The processing device of claim 6,
wherein the selection apparatus is designed to output, one after the other, the received signals in which the level of a different source is the strongest level.

8. The processing device of claim 6,
wherein the selection apparatus is designed to subtract from one another the received signals in which the level of a different source is the strongest level, and to output the resultant signal.

9. A method for processing a radio signal, the method comprising:
receiving the received signal by means of a plurality of receivers in a predetermined frequency range;
outputting a received signal for each of the receivers;
detecting a number of sources in the corresponding radio signal for each of the received signals;
if there is more than one source in at least one of the received signals, selecting one of the receivers on the basis of the information on the number of sources in the individual received signals, wherein, during the detecting, if there is more than one source in a received signal, a level of each signal component corresponding to the individual sources is determined, and the receiver is selected according to the determined levels; and
forwarding the received signal of the selected receiver.

10. The method of claim 9,
wherein, if more than one source is detected in a radio signal, an alert signal is transmitted to the corresponding sources.

11. The method of claim 9,
wherein, during the selection, if there is more than one source in one of the received signals, the received signal of the receiver in whose received signal the difference in the levels for the individual sources is the greatest is selected.

12. The method of claim 9,
wherein, during the selecting, if there is more than one source in one of the received signals, the received signal of the receiver in whose received signal the difference in the levels for the individual sources is the smallest is selected.

13. The method of claim 9,
wherein, if there is more than one source in a received signal, an alert signal is generated and output together with the selected received signal.

14. The method of claim 9,
wherein, during the selecting, if there is more than one source in at least two of the received signals, it is determined whether the level of a different source is the strongest level in different received signals.

15. The method of claim 14,
wherein the received signals in which the level of a different source is the strongest level are output one after the other.

16. The method of claim 14,
wherein the received signals in which the level of a different source is the strongest level are subtracted from one another and the resultant signal is output.

* * * * *